United States Patent [19]

Kameda

[11] Patent Number: 5,189,930
[45] Date of Patent: Mar. 2, 1993

[54] VEHICLE POWER TRANSMITTING MECHANISM

[75] Inventor: Osamu Kameda, Hiroshima, Japan

[73] Assignee: Mazda Motor Corp., Hiroshima, Japan

[21] Appl. No.: 656,519

[22] Filed: Feb. 19, 1991

[30] Foreign Application Priority Data

Feb. 19, 1990 [JP] Japan .................. 2-37782

[51] Int. Cl.$^5$ .......................................... F16H 35/04
[52] U.S. Cl. .................................. 74/650; 74/665 F;
74/665 GB; 192/87.11; 192/48.8; 192/49
[58] Field of Search .............. 74/650, 665 F, 665 GB;
192/87.11, 48.8, 49

[56] References Cited

U.S. PATENT DOCUMENTS

| | | | |
|---|---|---|---|
| 2,060,558 | 11/1936 | Sensaud de Lavaud | 74/650 |
| 3,686,976 | 8/1972 | Philippi | 74/711 |
| 4,681,180 | 7/1987 | Oyama et al. | 180/76 |
| 4,784,016 | 11/1988 | Masuda et al. | 74/650 |
| 4,829,849 | 5/1989 | Masuda et al. | 74/650 |
| 4,960,011 | 10/1990 | Asano | 74/650 |

FOREIGN PATENT DOCUMENTS

| | | | |
|---|---|---|---|
| 635368 | 9/1936 | Fed. Rep. of Germany | 74/650 |
| 62-94423 | 4/1987 | Japan . | |
| 62-94424 | 4/1987 | Japan . | |
| 2-26322 | 1/1990 | Japan | 192/87.11 |
| 2-163551 | 6/1990 | Japan | 74/650 |

Primary Examiner—Leslie A. Braun
Assistant Examiner—William C. Trousdell
Attorney, Agent, or Firm—Keck, Mahin & Cate

[57] ABSTRACT

A power transmitting system for a vehicle includes an input shaft, left and right output shafts, a speed reduction mechanism for transmitting a driving force from the input shaft to the output shafts, a left hydraulic clutch disposed between the speed reduction mechanism and the left output shaft for transmitting the driving force, a right hydraulic clutch disposed between the speed reduction mechanism and the right output shaft, and an oil pump for supplying a hydraulic pressure to the left and right hydraulic clutches. The left and right hydraulic clutches being disposed in the speed reduction mechanism, and the input shaft constitutes a primary element of the oil pump. A compact power transmitting system can be obtained in accordance with the invention.

14 Claims, 3 Drawing Sheets

VEHICLE POWER TRANSMITTING MECHANISM

BACKGROUND OF THE INVENTION

1. Field of the Invention

This invention relates to a driving power transmitting mechanism of a vehicle.

2. Description of Related Art

A conventionally rear wheel drive system of a vehicle is disclosed in Japanese Patent Public Disclosure No. 62-94,421, laid open to the public in 1987. This rear wheel drive system includes a pinion shaft meshed with a crown gear of a rear drive shaft within a speed reduction mechanism so that the rotation of the pinion shaft is transmitted to the rear drive shaft. Left and right ends of the rear drive shaft are connected with left and right rear axles through left and right hydraulic clutches, respectively, so that the left and right rear axles can be driven independently by controlling the enagement and disengagement of the left and right clutches.

It should, however, be noted that the conventional rear drive system is disadvantageous in that the left and right hydraulic clutches disposed at opposite sides of the speed reduction mechanism results in a spaced rear wheel drive system.

Moreover, the conventional system necessitates a space for arranging an oil pump for supplying hydraulic pressure for the hydraulic clutches. This is because the oil pump is separate from the rear wheel drive system.

In addition, since the oil pump is disposed away from the hydraulic clutches, the oil passage connecting therebetween long to cause undesirable pressure drop of the operating hyraulic pressure for the clutches. This may affect the reliability of operation of the hydraulic clutches.

SUMMARY OF THE INVENTION

It is, therefore an object of the invention to provide a compact power transmitting mechanism.

Another object of the invention is to provide an improved power transmitting mechanism in which the hydraulic pressure can be maintained high enough to provide a reliable operation of a hydraulic clutch.

The above and other objects of the invention can be accomplished by a power transmitting system for a vehicle comprising an input shaft, left and right output shafts, a speed reduction mechanism for transmitting a driving force from the input shaft to the output shafts, a left hydraulic clutch disposed between the speed reduction mechanism and the left output shaft for transmitting the driving force, a right hydraulic clutch disposed between the speed reduction mechanism and the right output shaft, and an oil pump for supplying a hydraulic pressure for the left and right clutches. The left and right hydraulic clutches are disposed in a ring gear case of the speed reduction mechanism, and the input shaft constitutes a primary element of the oil pump.

Preferably, the input shaft constitutes a drive shaft of the oil pump.

The hydraulic pressure produced in the oil pump through rotation of the input shaft is introduced to both of the clutches so that they are engaged or disengaged independently to drive the left and right output shafts or rear axles independently.

The hydraulic clutches are arranged within the ring gear case. Therefore, there is no need to provide a space for specifically arranging the clutches, resulting in a compact structure of the system. In addition, the input shaft constitutes one of several constituents of the oil pump. This also facilitates making the system compact. The oil pump can be arranged close to the hydraulic clutches so that the length of the hydraulic passage connecting the pump with the clutches can be reduced. This results in a smaller pressure drop in the passage and keeps operating pressure of the hydraulic clutches high. Therefore, a reliable operation of the clutches can be obtained.

A single casing employed for receiving the ring gear case and the oil pump can provide a single unit power transmitting system.

The above and other objects and features of the present invention will be apparent from the following description and by making reference to accompanying drawings.

DESCRIPTION OF THE PREFERRED EMBODIMENTS

Figure 1A:
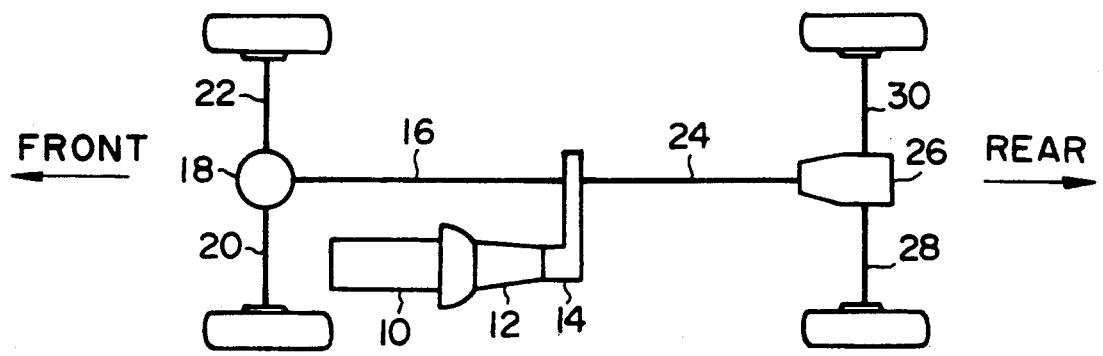
FIGS. 1A and 1B are schematic views of four wheel drive systems in accordance with preferred embodiments of the present invention.
Figure 1B:
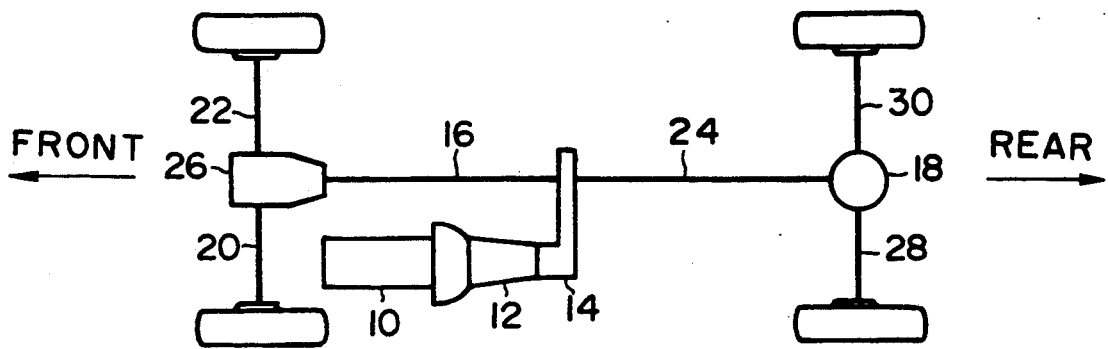

Referring to FIGS. 1A and 1B, there are schematically shown respective power transmitting systems to which the present invention can be applied.

In FIGS. 1A and 1B, a driving force from an engine 10 or transmission 12 is transmitted to a transfer 14. The driving force of the transfer 14 is transmitted to a front left output shaft or front left axle 20, and a front right output shaft or front right axle 22 through a front output shaft 16 and a front wheel drive mechanism 18. Likewise, the driving force from the transfer 14 is transmitted to left and right rear output shafts or rear axles 28, 30 through a rear output shaft 24 and a rear wheel drive mechanism 26.

The present invention can be applied to either the front or rear power transmitting mechanism.

Figure 2:
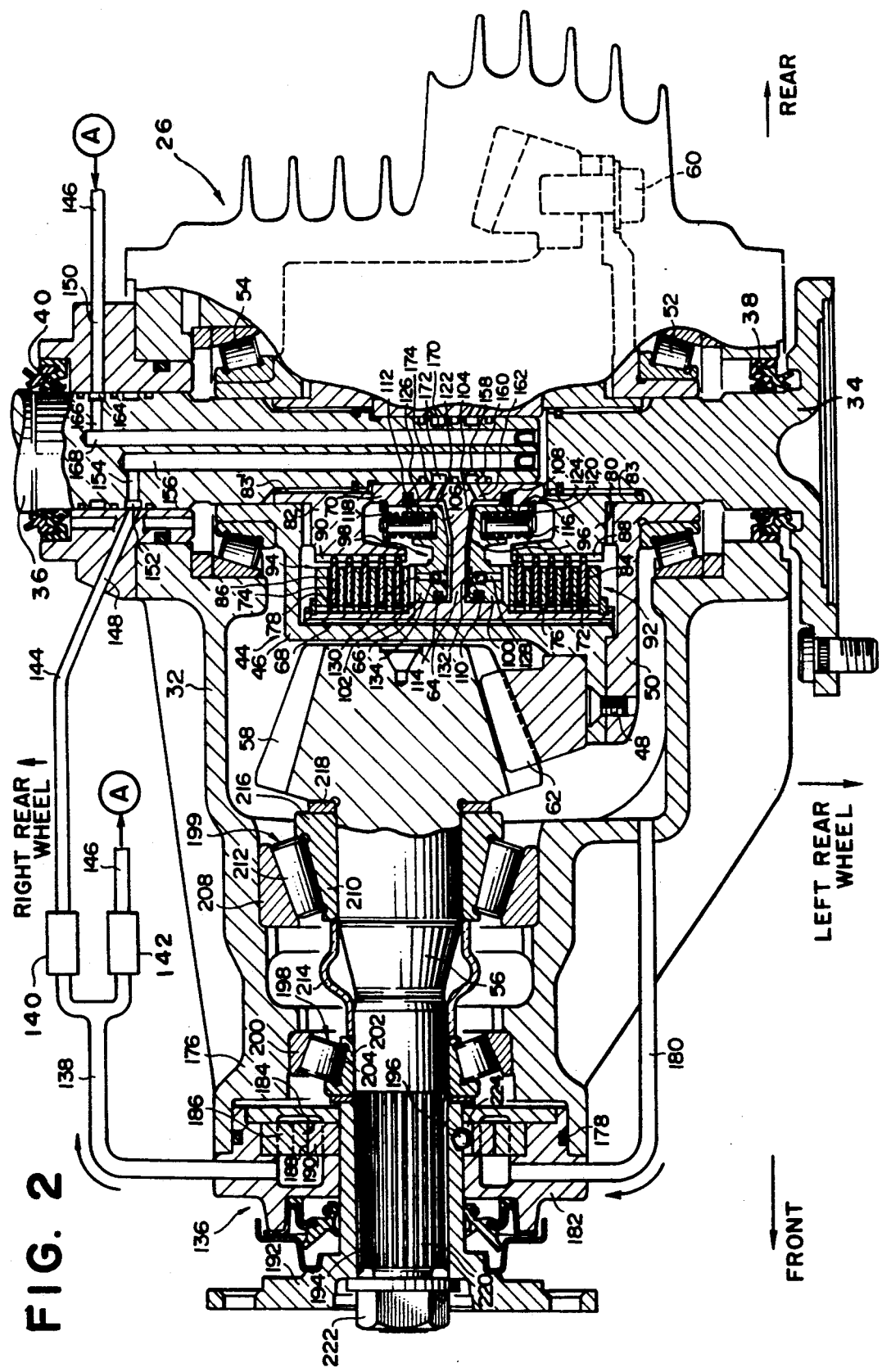
FIG. 2 is a sectional view of a rear wheel drive mechanism in accordance with another embodiment of the present invention.
Figure 3:
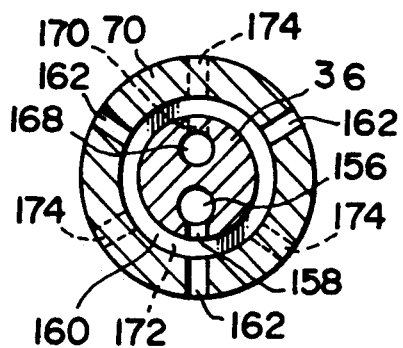
FIG. 3 is a sectional view of a right rear axle in accordance with the embodiment of FIG. 2.

Referring to FIG. 2, there is shown a sectional view along a horizontal plane of passing through the rear wheel drive mechanism 26.

The rear wheel drive mechanism 26 is provided with a casing 32 in which a left shaft 34 forming a part of the left rear axle 28 and a right shaft 36 forming a part of the right rear axle 30 are rotatably carried. Oil sealings 38, 40 are disposed between the casing 32 and the shaft 34, 36 for sealing.

Within the casing 32, a ring gear case 44 is rotatably mounted on the casing 32. The ring gear case 44 includes a cup like member 46 facing the right shaft 36 constituting a part of the right axle 30 and lid like member 50 facing the left shaft 34 constituting a part of the left axle 28 and joined with the cup like member 46 through a bolt 48. The lid like member 50 is rotatably carried by the casing 32 through a roller bearing mechanism 52. The member 50 rotatably carries the left shaft 34. The cup like member 46 is rotatably carried by the casing 32 through a roller bearing mechanism 54. The member 46 rotatably carries the right shaft 36.

An input shaft 56 of the rear wheel drive mechanism 26, joined with the drive shaft 24 at its front end is rotatably carried by the casing 32. The input shaft 56 extends in a direction perpendicular to the shafts 34, 36. The input shaft 56 is formed at its rear end with a drive pinion gear 58 which is meshed with a ring gear 62 fixed to the ring gear case 44 by means of a bolt 60. The input shaft 56 and the ring gear case 44 constitute a speed reduction mechanism.

There is provided a hydraulic clutch mechanism for transmitting rotation of the ring gear case 44 to the left and right output shafts 34, 36 independently.

Within the cup like member 46 of the ring gear case 44 is engaged an outer side or front side of a peripheral portion 66 of a support assembly 64 through a spline mechanism 68 formed thereon. The peripheral portion 66 extends in a plane perpendicular to the input shaft 56. An inner portion 70 of the support assembly 64 rotatably carries the output shaft 36. An inner side or rear side of the peripheral portion 66 is engaged with a plurality of left clutch plates 72 and right clutch plates 74 through the spline mechanisms 76 and 78. The output shafts 34, 36 are engaged with ring members 80, 82 through the spline mechanisms 83, 83' at outer surfaces. Outer or front sides of the ring members 80, 82 are engaged with a plurality of left clutch plates 84 and right clutch plates 86 through spline mechanism 88, 90. The clutch plates 72, 74, 84 and 86 are arranged in an overlapped relationship with each other in a plane in parallel do the output shafts 34, 36. The clutch plates 84, 86, 72 and 74 constitute a left hydraulic clutch 92 and a right hydraulic clutch 94. In order to operate the hydraulic clutches 92, 94, the support assembly 64 is provided with a left hydraulic pressure unit 96 and a right hydraulic pressure unit 98. The hydraulic pressure units 96, 98 are provided with pistons 100, 102, Hydraulic chambers 104, 106 are defined between the pistons 100, 102 and the support assembly 64. Numerals 108, 110, 112 and 114 designate oil sealings. There are disposed retainers 116, 118 at outer sides of the inner portion 70 and springs 120, 122 between the pistons 100, 102 and the retainers 116, 118. The pistons 100, 102 are urged toward initial positions by the springs 120, 122. The springs 120, 122 are disposed around rods 124, 126, which are mounted on the retainers 116, 118. Steel balls 132, 134 are disposed in oil passages 128, 130 communicated with the hydraulic chambers 104 and 106 to form check valves which prevent oil flow out of the chambers 104, 106 and allow oil flow to the chambers 104, 106. When hydraulic pressure is not introduced into the chambers 104, 106, the pistons 100, 102 are positioned at the initial positions by virtue of the springs 120, 122 so that the hydraulic clutches 92, 94 are disengaged. Thus, the rotation of the ring gear case 44 transmitted from the input shaft 56 is not transmitted to the left and right output shafts 34, 36.

When the hydraulic pressure is introduced into the chambers 104, 106, the pistons 100, 102 are moved against the springs 120, 122 to engage the hydraulic clutches 92, 94. As a result, the rotation of the ring gear case 44 transmitted from the input shaft 56 is transmitted to the left and right shafts 34, 36.

When the hydraulic pressure is introduced into one of the chambers 104, 106, the driving force is transmitted to the one of the clutches 92, 94 to drive one of the left and right output shafts 34, 36.

Hereinafter, there is described a hydraulic pressure introducing mechanism for the oil chambers 104, 106.

There is provided an oil pump 136, which is driven by the rotation of the input shaft 56. The hydraulic pressure generated in the oil pump 136 is introduced into the left and right control valves 140 and 142, which are duty solenoid valves, through an oil passage 138.

Thereafter, the hydraulic pressure is introduced into an oil passage 148 for the left hydaulic clutch 92 and an oil passage 150 for the right hydraulic clutch 94. Then, the hydraulic pressure of the oil passage 148 is introduced into the left oil chamber 104 through an annular recess 152, a radial oil passage 154, an axial oil passage 156, a radial oil passage 158, an annular recess 160 formed in the right shaft 36, and an oil passage 162 formed in the support assembly 64. The annular recesses 152 and 160 are formed in the right shaft 36. Consequently, the oil passage 148 can always be communicated with the radial oil passage 154 through the annular recess 152 and the radial oil passage 158 is always communicated with the oil passage 162 as the right shaft 36 is rotated relative to the casing 32 and the support assembly 64.

Likewise, the hydraulic pressure of the oil passage 150 is introduced into the oil chamber 106 through an annular recess 164, a radial oil passage 170, an annular oil recess 172 formed in the right shaft 36, and an oil passage 174 of the support assembly 64.

When the control valves 140, 142 are controlled independently, the hydraulic pressure of the chambers 104 and 106 can be controlled independently.

The oil pump 136 is mounted on an end portion 176 of the casing 32. An oil sealing 178 is disposed between the end portion 176 of the casing 32 and the oil pump 136 for sealing. Number 180 designates an oil return passage for returning the oil in the casing 32 to the oil pump 136.

Figure 4:
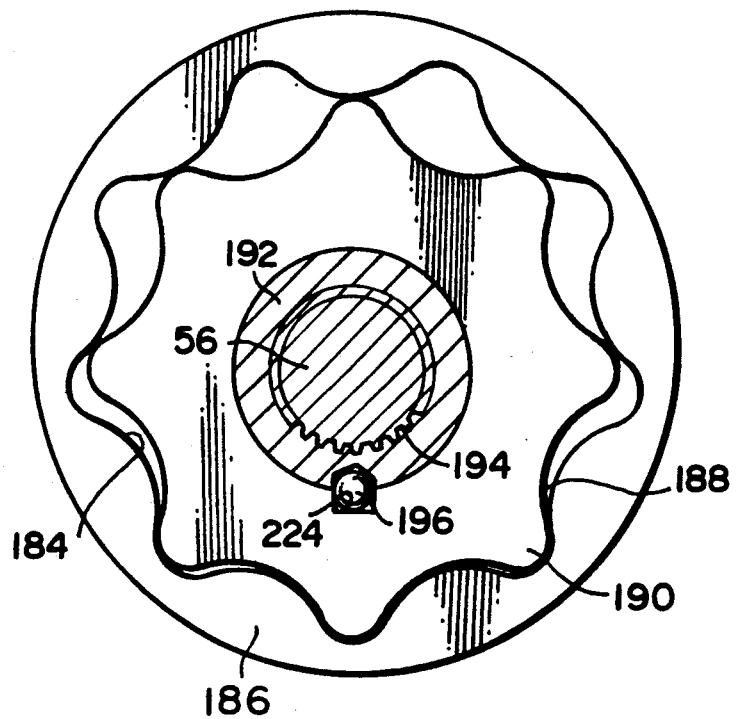
FIG. 4 is a sectional view of an oil pump in accordance with the embodiment of FIG. 2.

Referring further to FIG. 4, the pump 136 is of a trochoidal configuration and is provided with a pump housing 182, an outer ring assembly 186 rotatably disposed in the pump housing 182 and formed with inner teeth 184, and an inner ring assembly 190 rotatably disposed in the outer ring assembly 186 and formed with outer teeth 188. The outer ring assembly 186 has a different rotation axis from the inner ring assembly 190 so that the inner teeth 184 of the outer ring assembly 186 are partly meshed with the outer teeth 188 of the inner ring assembly 190. A flange member 192 is engaged with the input shaft 56 through a spline mechanism 194. The flange 192 is engaged with the inner ring assembly 190 through a steel ball 196.

Since the flange 192 is rotated integrally with the input shaft 56, the inner ring assembly 190 is also rotated to rotate the outer ring assembly 186. This rotation of the inner and outer ring assemblies 186 and 190 produces the hydraulic pressure which is introduced into the oil passage 138.

Roller bearing mechanisms 198, 199 are provided within the casing 32 for rotatably carrying the input shaft 56. The roller bearing mechanism 198 is provided with a support member 200 mounted on the casing 32, a support member 202 mounted on the input shaft 56, and roller bearings 204 between the members 200 and 202. Likewise, the roller bearing mechanism 199 is provided with a support member 208 mounted on the casing 32, a support member 210 mounted on the input shaft 56, and roller bearings 212 between the members 208 and 210. The support members 202 and 210 are movable for adjustment in an axial direction of the input shaft 56. A spring 214 is disposed between the support members 202 and 210 in the axial direction for urging them apart. The support member 210 abuts against a stopper 218 at a right end portion 216 so that further rightward movement is restricted.

When the input shaft 56 is positioned relative to the casing 32, a bolt 222 at a front end portion 220 thereof is released so that the flange 192 can be moved relative to the input shaft since they are engaged with each other through the spline mechanism 194. This axial movement of the flange 192 causes the support member 202 to be moved in the axial direction of the input shaft 56 against and with the resilient force of the spring 214.

As mentioned, the axial position of the support member 202 is adjusted so that the input shaft 56 is axially positioned relative to the casing 32. As a result, the drive pinion gear 58 of the input shaft 56 can be appropriately positioned to be engaged with the ring gear 62 of the ring gear case 44. The flange 192 is engaged with the inner ring assembly 136 of the oil pump 190 through the steel ball 196. A recess 224 of the inner ring assembly 190 is extended in the axial direction of the input shaft 56. Thus, as the flange 192 is moved axially, the steel ball can be moved axially within the recess 224 of the inner ring assembly 190 to allow relative movement of the pump 136 and the flange 192. In other words, the axial movement of the flange 192 does not affect the pump 136 badly.

In the embodiment illustrated in FIG. 2, although the drive mechanism is applied to a rear wheel drive mechanism, it can be similarly applied to a front wheel drive mechanism.

The driving force of the engine 10 can be controlled for the respective wheels through control of the control valves 142, 140 in combination with control of the clutches 92 and 94 as in the former embodiment so that the same effect can be obtained.

It should be noted that although the present invention is described in connection with a specific embodiment and by taking reference to the accompanying drawings, many modifications can be made by the those skilled in the art based on the foregoing, and all of the modifications which fall within the scope of the present invention defined by the attached claims are intended to be protected.

What is claimed is:

1. A power transmitting system for a vehicle comprising:
    an input shaft,
    left and right output shafts,
    a speed reduction mechanism for transmitting a driving force from the input shaft to the output shafts,
    a left hydraulic clutch disposed between the speed reduction mechanism and the left output shaft and for transmitting the driving force,
    a right hydraulic clutch disposed between the speed reduction mechanism and the right output shaft,
    an oil pump for supplying a hydraulic pressure for the left and right clutches,
    the left and right hydraulic clutches being disposed in the speed reduction mechanism, and the input shaft constituting a primary element of the oil pump.

2. A power transmitting system as recited in claim 1 wherein the input shaft constitutes a drive shaft of the oil pump.

3. A power transmitting system as recited in claim 1 wherein the pump is of trochoidal configuration and is provided with a pump housing, an outer ring assembly disposed in the pump housing and formed with inner teeth, and an inner ring assembly rotatably disposed in the outer ring assembly and formed with outer teeth.

4. A power transmitting system as recited in claim 3 wherein the outer ring assembly has a different rotation axis from the inner ring assembly so that the inner teeth of the outer ring assembly is partly mashed with the outer teeth of the inner ring assembly.

5. A power transmitting system as recited in claim 1 wherein the speed reduction mechanism comprises a casing for rotatably carrying the left and right output shafts.

6. A power transmitting system as recited in claim 5 wherein the speed reduction mechanism further comprises a ring gear case rotatably mounted on the casing.

7. A power transmitting system as recited in claim 6 wherein the ring gear case comprises a cup like member facing the right output shaft, and lid like member facing the left output shaft and joined with the cup like member.

8. A power transmitting system as recited in claim 6 wherein the input shaft is formed at a rear end with a drive pinion gear which is meshed with a ring gear fixed to the ring gear case.

9. A power transmitting system as recited in claim 6 wherein the ring gear case is engaged with a support assembly which rotatably carries the right output shaft.

10. A power transmitting system as recited in claim 6 further comprising a hydraulic pressure unit including a piston and a hydraulic chamber formed between a piston and a support assembly.

11. A power transmitting system, as recited in claim 1 wherein the input shaft extends in a direction perpendicular to the left and right output shafts.

12. A power transmitting system as recited in claim 1 wherein the left hydraulic clutch and the right hydraulic clutch are both multi-plate hydraulic clutches operated by hydraulic pressure.

13. A power transmitting drive system as recited in claim 1 further comprising a pair of control valves for driving the right and left hydraulic clutches.

14. A power transmitting system as recited in claim 13 wherein each of the control valves is a solenoid valve.

* * * * *